(12) United States Patent
Choi et al.

(10) Patent No.: US 12,020,136 B2
(45) Date of Patent: Jun. 25, 2024

(54) OPERATING METHOD AND TRAINING METHOD OF NEURAL NETWORK AND NEURAL NETWORK THEREOF

(71) Applicant: Samsung Electronics Co., Ltd., Suwon-si (KR)

(72) Inventors: Junhwi Choi, Seongnam-si (KR); Young-Seok Kim, Suwon-si (KR); Jeong-Hoon Park, Seoul (KR); Seongmin Ok, Yongin-si (KR); Jehun Jeon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 939 days.

(21) Appl. No.: 16/292,545

(22) Filed: Mar. 5, 2019

(65) Prior Publication Data

US 2020/0104675 A1    Apr. 2, 2020

(30) Foreign Application Priority Data

Sep. 28, 2018    (KR) .................. 10-2018-0115882

(51) Int. Cl.
*G06N 3/045*    (2023.01)
*G06N 3/048*    (2023.01)
(Continued)

(52) U.S. Cl.
CPC .............. *G06N 3/045* (2023.01); *G06N 3/048* (2023.01); *G06N 3/084* (2013.01); *G06V 20/584* (2022.01); *G10L 15/16* (2013.01)

(58) Field of Classification Search
CPC .... G06N 3/0454; G06N 3/0481; G06N 3/084; G06V 20/584; G10L 15/16
See application file for complete search history.

(56) References Cited

U.S. PATENT DOCUMENTS 9,714,885 B2    7/2017    Qin et al.
9,818,410 B2    11/2017    Sak et al.
(Continued)

FOREIGN PATENT DOCUMENTS

JP    4-360238 A    12/1992
JP    2017-12646 A    1/2017
(Continued)

OTHER PUBLICATIONS

Park et al., "Sequence-to-Sequence Prediction of Vehicle Trajectory via LSTM Encoder-Decoder Architecture," in 2018 IEEE Intelligent Vehicles Symp. 1672-78 (2018). (Year: 2018).*
(Continued)

*Primary Examiner* — Ryan C Vaughn
(74) *Attorney, Agent, or Firm* — NSIP Law

(57) ABSTRACT

Disclosed is an operation method of a neural network including a first network and a second network, the method including acquiring state information output from the first network based on input information, determining whether the state information satisfies a condition using the second network, iteratively applying the state information to the first network in response to determining that the state information does not satisfy the condition, and outputting the state information in response to determining that the state information satisfy the condition.

25 Claims, 9 Drawing Sheets

(51) Int. Cl.
*G06N 3/084* (2023.01)
*G06V 20/58* (2022.01)
*G10L 15/16* (2006.01)

(56) References Cited

U.S. PATENT DOCUMENTS

| | | | |
|---|---|---|---|
| 9,959,518 B2 | 5/2018 | Mourra | |
| 10,063,575 B2* | 8/2018 | Vasseur | G06N 20/00 |
| 10,963,819 B1* | 3/2021 | Gangadharaiah | G06N 3/044 |
| 2010/0179935 A1* | 7/2010 | Srinivasa | G06N 3/049 |
| | | | 706/21 |
| 2013/0297541 A1* | 11/2013 | Piekniewski | G06N 3/088 |
| | | | 706/26 |
| 2016/0098629 A1 | 4/2016 | Lipasti et al. | |
| 2017/0200076 A1 | 7/2017 | Vinyals et al. | |
| 2017/0220925 A1 | 8/2017 | Alsharif et al. | |
| 2018/0005676 A1 | 1/2018 | Neil et al. | |
| 2018/0012121 A1 | 1/2018 | Liu et al. | |
| 2018/0060687 A1* | 3/2018 | Wang | G06N 3/045 |
| 2018/0121794 A1 | 5/2018 | Bhandary | |
| 2018/0129919 A1 | 5/2018 | Tang et al. | |
| 2018/0129938 A1* | 5/2018 | Xiong | G06N 5/022 |
| 2019/0385092 A1* | 12/2019 | Benke | G06N 20/00 |
| 2020/0036995 A1* | 1/2020 | Rippel | G06V 10/774 |

FOREIGN PATENT DOCUMENTS

| | | |
|---|---|---|
| JP | 2018-67039 A | 4/2018 |
| KR | 10-2017-0050029 A | 5/2017 |

OTHER PUBLICATIONS

Zhu et al., "HiDDeN: Hiding Data with Deep Networks," in Proc. Eur. Conf. Computer Vision 657-72 (2018). (Year: 2018).*
U.S. Appl. No. 62/703,361, pp. 4-5 (2018). (Year: 2018).*
Ponti et al., "Everything You Wanted to Know about Deep Learning for Computer Vision but Were Afraid to Ask," in 30th SIBGRAPI Conf. Graphics, Patterns and Images Tutorials 17-41 (2017). (Year: 2017).*
Hochreiter, Sepp et al., "Long Short-Term Memory", *Neural Computation*, vol. 9, Issue 8, Nov. 15, 1997 (pp. 1-18).
Graves, Alex et al., "Speech Recognition with Deep Recurrent Neural Networks", *2013 IEEE International Conference on Acoustics, Speech and Signal Processing*, Mar. 22, 2013 (pp. 6645-6649).
Cho, Kyunghyun, et al., "Learning Phrase Representations using RNN Encoder-Decoder for Statistical Machine Translation", *arXiv preprint arXiv:1406.1078*, Sep. 3, 2014 (15 pages in English).
Maggiori, Emmanuel et al., "Recurrent Neural Networks to Correct Satellite Image Classification Maps", *IEEE Transactions on Geoscience and Remote Sensing*, vol. 55, Issue 9, 2017 (10 pages in English).
Extended European Search Report dated Feb. 17, 2020 in counterpart European Application No. 19195403.1 (8 pages in English).
Japanese Office Action dated Jul. 11, 2023, in counterpart Japanese Patent Application No. 2019-114796 (4 pages in English, 11 pages in Japanese).

* cited by examiner

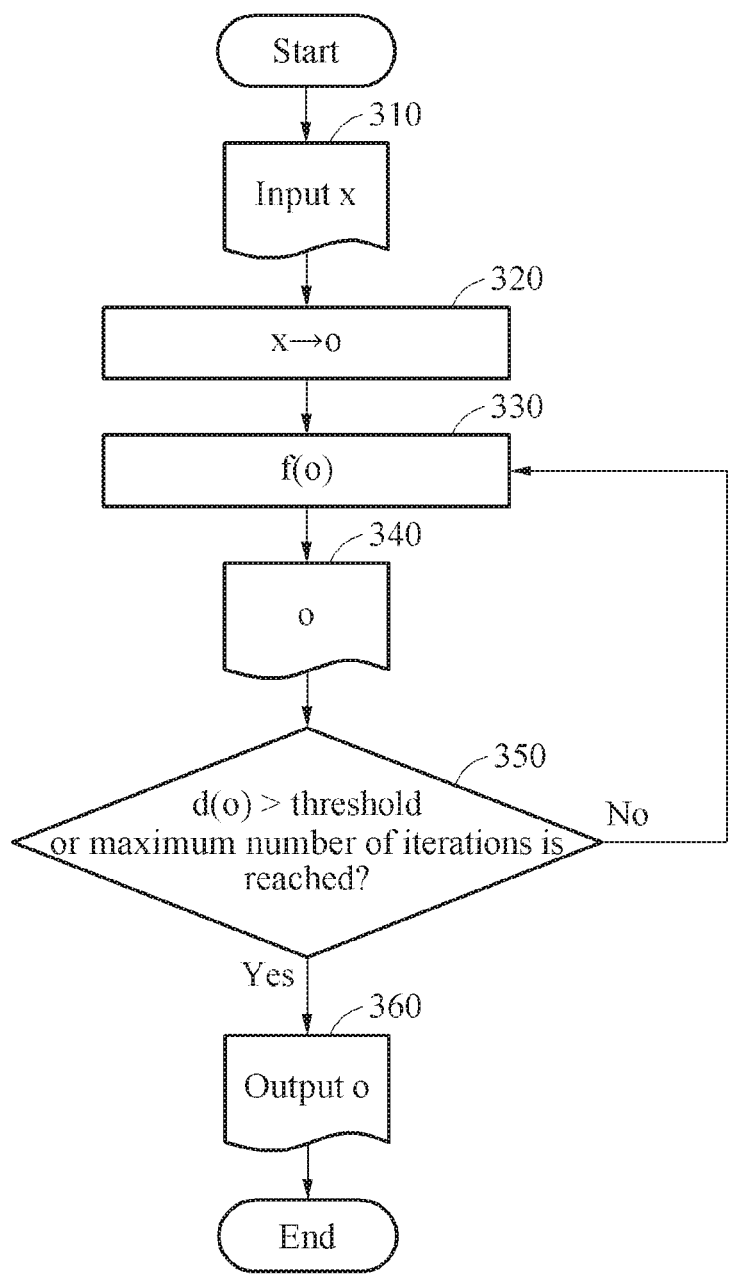

OPERATING METHOD AND TRAINING METHOD OF NEURAL NETWORK AND NEURAL NETWORK THEREOF

CROSS-REFERENCE TO RELATED APPLICATIONS

This application claims the benefit under 35 USC § 119(a) of Korean Patent Application No. 10-2018-0115882 filed on Sep. 28, 2018 in the Korean Intellectual Property Office, the entire disclosure of which is incorporated herein by reference for all purposes.

BACKGROUND

1. Field

The following description relates to a neural network and an operation method and a training method of the neural network.

2. Description of Related Art

A neural network is a framework or a structure of a number of layers or operations that provide for many different machine learning algorithms to work together, process complex data inputs, and recognize patterns. A neural network in a form of a deep neural network (DNN) may secure high translation ability or high performance with respect to a feature vector. However, the DNN includes a number of layers having various weights and uses a large storage space for storing all of the layers. A recurrent network, for example, a recurrent neural network (RNN) that processes sequential data performs operations for a desired number of iterations, for example, a length of sequential data. Accordingly, it is not easy to apply to a general feature vector other than the sequential data. Also, if the length of sequential data is too long, a processing time increases.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided an operation method of a neural network including a first network and a second network, the method including acquiring state information output from the first network based on input information, determining whether the state information satisfies a condition using the second network, iteratively applying the state information to the first network in response to determining that the state information does not satisfy the condition, and outputting the state information in response to determining that the state information satisfies the condition.

The determining may include comparing a threshold and an evaluation result corresponding to the state information, the state information being output from the second network.

The determining may include comparing a number of iterations to a number of times the state information is iteratively applied to the first network.

The input information may correspond to an input vector, and the state information may correspond to an output vector.

The first network may be configured to iteratively process the input information to provide an application service, and the second network may be configured to evaluate the state information corresponding to a result of the iterative processing of the first network.

The method may include decoding the state information using a third network, to provide an application service.

The method may include encoding the input information to a dimension of the state information, and applying the encoded input information to the first network.

The iteratively applying may include encoding the state information to a dimension of the input information, and applying the encoded state information to the first network.

The input information may include any one or any combination of single data and sequential data.

The method may include encoding sequential data to an embedding vector of an input dimension of the first network in response to the input information being the sequential data, and applying the embedding vector to the first network.

The outputting may include decoding the state information to the sequential data and outputting the decoded state information.

The first network may include a neural network for voice recognition or a neural network for image recognition.

The first network may include at least one of a fully-connected layer, a simple recurrent neural network, a long-short term memory (LSTM), or gated recurrent units (GRUs).

In another general aspect, there is provided a method of training a neural network including a first network and a third network, the method including generating state information for each iteration by applying input information corresponding to training data to the first network for a number of iterations, predicting a result corresponding to the state information for the each iteration using the third network, and training the first network based on a first loss between the result predicted for the each iteration and ground truth corresponding to the input information.

The method may include training a second network configured to evaluate the state information based on an evaluation score of the result predicted for the each iteration.

The training of the second network may include determining the evaluation score by evaluating the result predicted for the each iteration and a result predicted for the each iteration based on the ground truth.

The training of the second network may include applying noise to a portion of the state information for the each iteration.

The training of the first network may include training the third network based on the first loss.

The method may include encoding the input information to a dimension of the state information, and applying the encoded input information to the first network.

The generating may include encoding the state information to a dimension of the input information, and applying the encoded state information to the first network.

The number of iterations may be based on a level of recognition corresponding to an application service provided by the neural network.

The number of iterations may be increased in response to higher level of recognition, and the number of iterations is decreased in response to a lower level of recognition.

In another general aspect, there is provided a neural network including a first network configured to generate state information based on input information, a second network configured to determine whether the state information satisfies a condition, and a processor configured to iteratively apply the state information to the first network in response to the state information not satisfying the condition, and to output the state information in response to the state information satisfying the condition.

The second network may be configured to compare a threshold and an evaluation result corresponding to the state information, output from the second network.

The second network may be configured to compare a number of iterations to a number of times the state information is iteratively applied to the first network.

The first network may be configured to iteratively process the input information to provide an application service, and the second network may be configured to evaluate the state information corresponding to a result of the iterative processing of the first network.

The neural network may include a third network configured to decode the state information to provide an application service.

The processor may be configured to encode the input information as a dimension of the state information, and to apply the encoded input information to the first network.

The processor may be configured to encode the state information as a dimension of the input information, and to apply the encoded state information to the first network.

The input information may include any one or any combination of single data and sequential data.

The neural network may include an encoder configured to encode sequential data to an embedding vector of an input dimension of the first network, in response to the input information being the sequential data, wherein the processor may be configured to apply the embedding vector to the first network.

The neural network may include a decoder configured to decode the state information to the sequential data, in response to the input information being the sequential data, wherein the processor may be configured to output the decoded state information.

In another general aspect, there is provided an electronic device, including a sensor configured to receive an input information, a memory configured to store the input information, a first network, a second network, a third network, and instructions, and a processor configured to execute the instructions to implement the first network configured to generate state information based on the input information, implement the second network configured to determine whether the state information satisfies a condition, implement the third network configured to decode the state information to provide an application service, iteratively apply the state information to the first network, in response to the state information not satisfying the condition, and output the decoded state information, in response to the state information satisfying the condition.

The processor may be configured to compare a threshold to a result of evaluation of the state information by the second network.

The processor may be configured to compare a number of iterations to a number of times the state information is iteratively applied to the first network.

Other features and aspects will be apparent from the following detailed description, the drawings, and the claims.

BRIEF DESCRIPTION OF THE DRAWINGS

FIGS. 2 and 3 are diagrams illustrating examples of a method of operation of a neural network.

Figure 1:
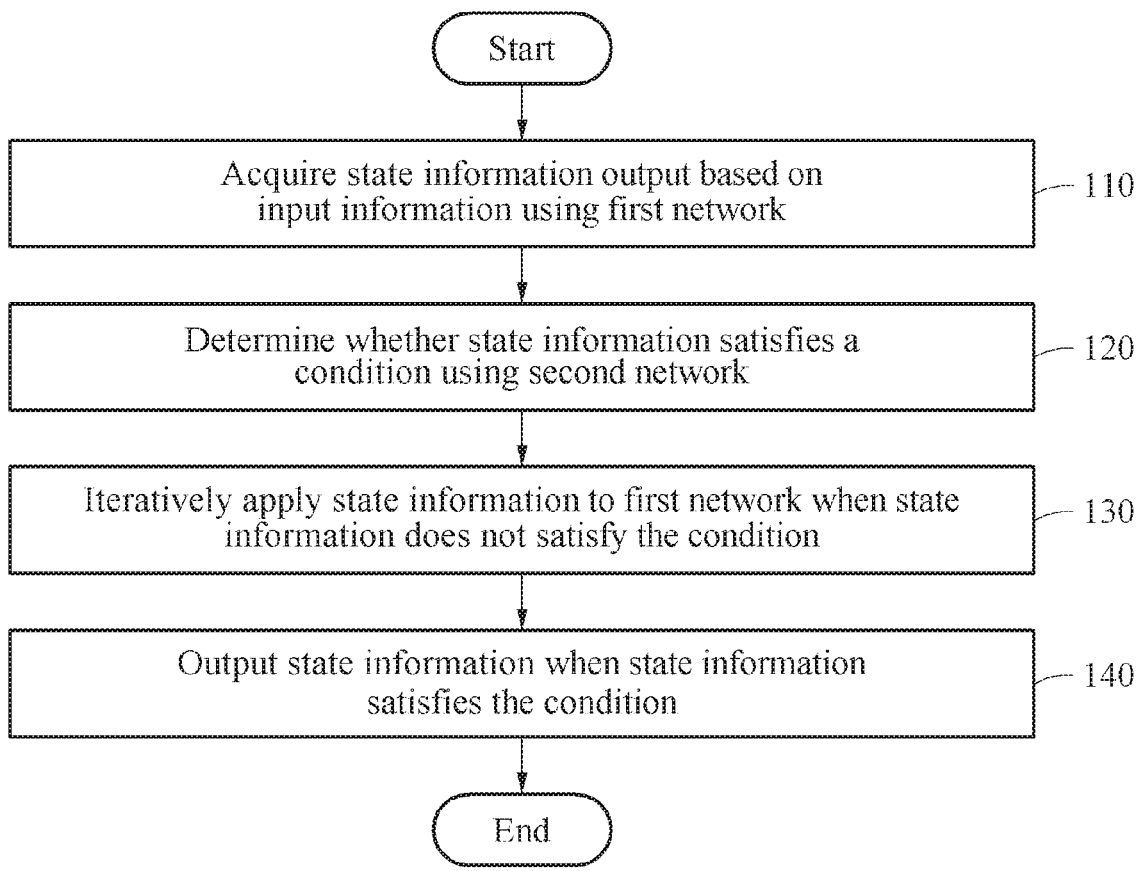
FIG. 1 is a diagram illustrating an example of an operation method of a neural network.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

When a part is connected to another part, it includes not only a case where the part is directly connected but also a case where the part is connected with another part in between. Also, when a part includes a constituent element, other elements may also be included in the part, instead of the other elements being excluded, unless specifically stated otherwise. Although terms such as "first," "second," "third" "A," "B," (a), and (b) may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

If the specification states that one component is "connected," "coupled," or "joined" to a second component, the first component may be directly "connected," "coupled," or "joined" to the second component, or a third component may be "connected," "coupled," or "joined" between the first component and the second component. However, if the specification states that a first component is "directly connected" or "directly joined" to a second component, a third component may not be "connected" or "joined" between the first component and the second component. Similar expressions, for example, "between" and "immediately between" and "adjacent to" and "immediately adjacent to," are also to be construed in this manner.

The terminology used herein is for the purpose of describing particular examples only, and is not intended to limit the disclosure or claims. The singular forms "a," "an," and "the" include the plural forms as well, unless the context clearly indicates otherwise. The terms "comprises," "comprising," "includes," and "including" specify the presence of stated features, numbers, operations, elements, components, or combinations thereof, but do not preclude the presence or addition of one or more other features, numbers, operations, elements, components, or combinations thereof.

The use of the term 'may' herein with respect to an example or embodiment, e.g., as to what an example or embodiment may include or implement, means that at least one example or embodiment exists where such a feature is included or implemented while all examples and embodiments are not limited thereto.

FIG. 1 is a diagram illustrating an example of an operation method of a neural network. The operations in FIG. 1 may be performed in the sequence and manner as shown, although the order of some operations may be changed or some of the operations omitted without departing from the spirit and scope of the illustrative examples described. Many of the operations shown in FIG. 1 may be performed in parallel or concurrently. One or more blocks of FIG. 1, and combinations of the blocks, can be implemented by special purpose hardware-based computers that perform the specified functions, or combinations of special purpose hardware and computer instructions.

Referring to FIG. 1, in operation 110, a neural network acquires state information output based on input information using a first network. In an example, the neural network may be configured as a single network and may also be configured as a recurrent network. For example, the neural network includes a fully-connected layer, a simple recurrent neural network (RNN), a long-short term memory (LSTM) network, and gated recurrent units (GRUs). In an example, the input information includes at least one of single data and sequential data. In an example, the input information may be an image or voice. The input information may be information of the same dimension as that of the state information and may be information of a dimension different from that of the state information. The state information corresponds to a result of processing, by the neural network, the input information and/or an iterative processing result of the neural network. In an example, the state information corresponds to one or both of the output of the neural network from a previous time and an internal state of the neural network from the previous time step. In an example, the neural network uses the state information as a starting point for the current time step. In an example, the state information may be a multi-dimensional intermediate calculation vector or output vector according to a task for providing the application service. In other examples, the state information may be various types of information that may be output from the neural network in response to the input information. In an example, the RNN may include a sub-sampling layer, a pooling layer, a fully connected layer, etc., in addition to a convolution layer.

The neural network may be implemented as an architecture having a plurality of layers including an input image, feature maps, and an output. In the neural network, a convolution operation between the input image, and a filter referred to as a kernel, is performed, and as a result of the convolution operation, the feature maps are output. Here, the feature maps that are output are input feature maps, and a convolution operation between the output feature maps and the kernel is performed again, and as a result, new feature maps are output. Based on such repeatedly performed convolution operations, results of recognition of characteristics of the input image via the neural network may be output.

In another example, the neural network may include an input source sentence (e.g., voice entry) instead of an input image. In such an example, a convolution operation is performed on the input source sentence with a kernel, and as a result, the feature maps are output. The convolution operation is performed again on the output feature maps as input feature maps, with a kernel, and new feature maps are output. When the convolution operation is repeatedly performed as such, a recognition result with respect to features of the input source sentence may be finally output through the neural network.

The first network iteratively processes the input information to provide an application service. The first network may include, for example, a neural network for voice recognition or a neural network for image recognition.

In operation 120, the neural network determines whether the state information satisfies a condition using the second network. The second network evaluates the state information output from the first network. In an example, any type of network may be applied to the second network. For example, the second network may be included in an evaluation logic configured to evaluate the state information. The condition may be used to determine whether the state information is saturated to a level sufficient to perform a task for providing the application service. In an example, the condition includes an evaluation result corresponding to the state information that is greater than a threshold and/or a number of times the state information is iteratively applied to the first network corresponding to a number of iterations. In operation 120, in an example, the neural network evaluates the state information by comparing the threshold to the evaluation result corresponding to the state information or by comparing the number of iterations to the number of times the state information is iteratively applied to the first network.

In operation 130, the neural network iteratively applies the state information to the first network when it is determined that the state information does not satisfy the condition in operation 120. In one example, by iteratively applying state information output from the first network to the first network, a high translation ability may be secured without using a large storage space for a DNN including multiple layers.

In operation 140, the neural network outputs the state information when it is determined that the state information satisfies the condition. For example, the state information output in operation 140 may be output as a final result through a softmax layer.

Figure 2:
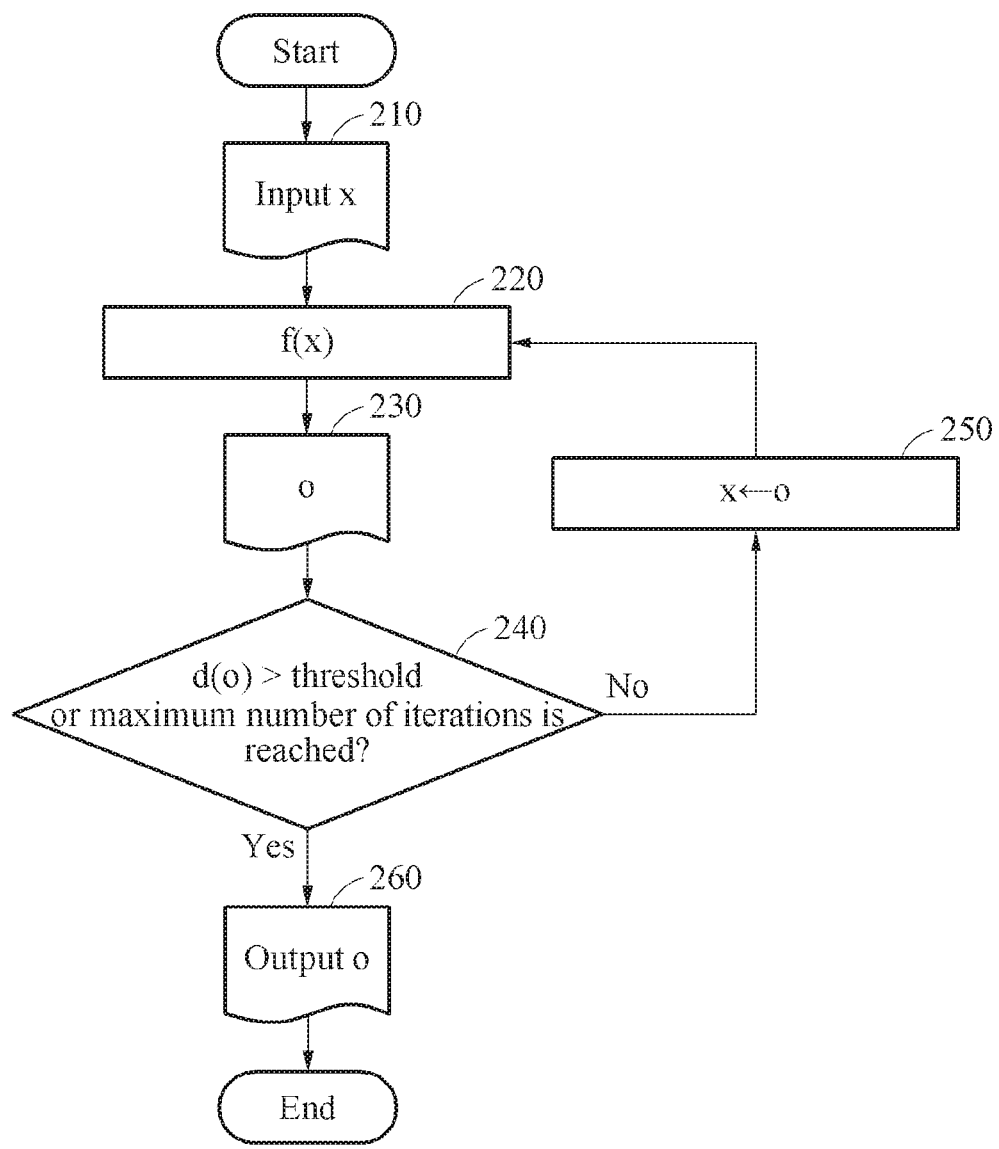

FIG. 2 is a diagram illustrating an example of a method of operating a neural network. The operations in FIG. 2 may be performed in the sequence and manner as shown, although the order of some operations may be changed or some of the operations omitted without departing from the spirit and scope of the illustrative examples described. Many of the operations shown in FIG. 2 may be performed in parallel or concurrently. One or more blocks of FIG. 2, and combinations of the blocks, can be implemented by special purpose hardware-based computers that perform the specified functions, or combinations of special purpose hardware and computer instructions. In addition to the description of FIG. 2 below, the descriptions of FIG. 1 are also applicable to FIG. 2, and are incorporated herein by reference. Thus, the above description may not be repeated here.

The neural network includes a first network, which is represented with f, and a second network, which is represented with d. In an example, the first network refers to a network configured to process an input vector x corresponding to input information and to generate an output vector o corresponding to state information. In an example, the second network refers to an evaluation network configured to evaluate the output vector o and to determine whether to iteratively apply the output vector o to the first network.

Referring to FIG. 2, in operation 210, the input information (Input x) is input to the neural network. In operation 220, the neural network applies the input information to the first network (f(x)). In operation 230, the first network (f(x)) outputs the state information (o).

In operation 240, the neural network evaluates the state information using the second network. For example, in operation 240, the neural network determines whether an evaluation result (d(o)) satisfies a threshold. Here, the neural network determines whether the evaluation result (d(o)) satisfies the threshold set as a hyper parameter. In an example, the hyper parameter is a parameter whose value may be set before the method of operating a neural network of FIG. 2 begins. In another example, when the evaluation result (d(o)) does not satisfy the threshold, the neural network determines whether the number of times the state information is iteratively applied to the first network reaches a number of iterations, for example, a maximum number of iterations.

When it is determined that the evaluation result (d(o)) satisfies the threshold or that the number of times the state information is iteratively applied to the first network reaches the maximum number of iterations, in operation 260, the neural network outputs the state information (Output o). For example, if threshold=0.7 and evaluation result (d(o))=0.8, the neural network may suspend recurrence of the first network (f) and output the state information (o).

When it is determined that the evaluation result (d(o)) does not satisfy the threshold or that the number of times the state information is iteratively applied to the first network does not reach the maximum of iterations, in operation 250, the neural network encodes the state information to a dimension of the input information for iterative processing of the state information (x←o). In operation 220, the neural network applies the encoded state information to the first network.

In one example, since it may be difficult to acquire a ground truth evaluation result from the second network before training, the second network needs to be trained using a different method. A training method of the second network is described with reference to FIGS. 8 and 9.

In one example, the neural network may evaluate how much state information output from the first network helps a task for providing an application service using the second network. That is, the neural network may evaluate, i.e., determine whether the state information is sufficient to perform the task. When the evaluation result of the second network is unsatisfactory, the neural network may further perform iterative processing using the first network. When the evaluation result of the second network is satisfactory, the neural network may output the state information.

In one example, the neural network is also referred to as a self-decidable recurrent neural network (RNN) in that the neural network itself determines whether to perform iterative processing.

FIG. 3 is a diagram illustrating another example of an operation method of a neural network. The operations in FIG. 3 may be performed in the sequence and manner as shown, although the order of some operations may be changed or some of the operations omitted without departing from the spirit and scope of the illustrative examples described. Many of the operations shown in FIG. 3 may be performed in parallel or concurrently. One or more blocks of FIG. 3, and combinations of the blocks, can be implemented by special purpose hardware-based computers that perform the specified functions, or combinations of special purpose hardware and computer instructions. In addition to the description of FIG. 3 below, the descriptions of FIGS. 1-2 are also applicable to FIG. 3, and are incorporated herein by reference. Thus, the above description may not be repeated here.

Referring to FIG. 3, in operation 310, the input information (Input x) is input to the neural network. In operation 320, the neural network encodes the input information as a dimension of state information (x→o) prior to applying the input information to the first network. In operation 330, the neural network applies the encoded input information to the first network (f(o)). In operation 340, the neural network outputs the state information from the first network (o).

In operation 350, the neural network evaluates the state information using the second network. For example, in operation 350, the neural network determines whether an evaluation result (d(o)) satisfies a threshold or whether a number of times the state information is iteratively applied to the first network reaches a number of iterations, for example, a maximum number of iterations.

In operation 350, when it is determined that the evaluation result (d(o)) satisfies the threshold or the number of times the state information is iteratively applied to the first network reaches the maximum number of times, in operation 360, the neural network outputs the state information (Output o).

In operation 350, when it is determined that the evaluation result (d(o)) does not satisfy the threshold or that the number of times the state information is iteratively applied to the first network does not reach the maximum number of times in operation 330, the neural network iteratively applies the state information to the first network (f(o)).

Figure 4A:
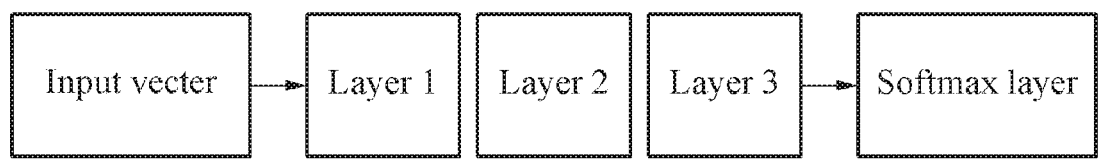
FIGS. 4A and 4B illustrate examples of a neural network.
Figure 4B:
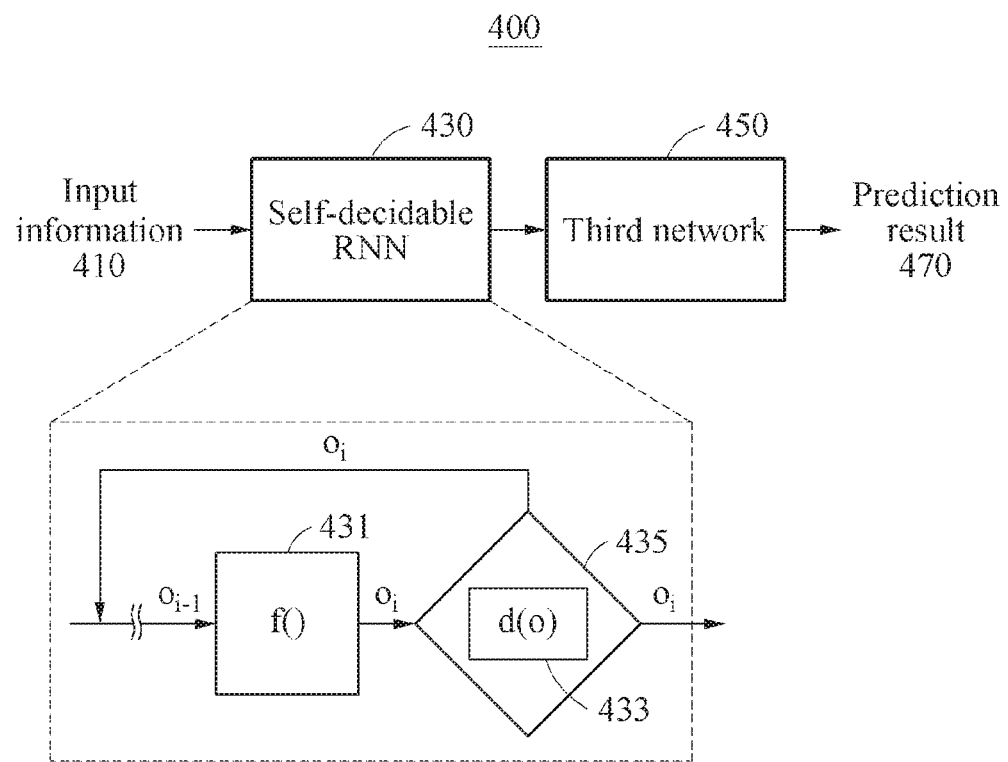

FIGS. 4A and 4B illustrate examples of neural networks that are implemented as perceptron systems. FIG. 4A illustrates a perceptron system including three layers. Referring to FIG. 4A, an input vector that is input to the perceptron system goes through a first layer (Layer 1), a second layer (Layer 2), and a third layer (Layer 3). In an example, a probability distribution of each label is generated through a softmax layer. Here, the three layers (Layer 1, Layer 2, and Layer 3) separately operate and a separate weight is stored for each layer.

FIG. 4B illustrates a neural network 400 in which the perceptron system is configured by a self-decidable RNN 430. In an example, when the perceptron system is configured as the self-decidable RNN, a maximum number of iterations for the self-decidable RNN may be 3 or more.

Here, a translation ability for an input vector or input information 410 may be equal among the three layers (Layer 1, Layer 2, and Layer 3) of FIG. 4A and the self-decidable RNN 430 of FIG. 4B. However, the self-decidable RNN 430 uses a relatively small memory compared to the three layers (Layer 1, Layer 2, and Layer 3). The self-decidable RNN 430 may be relatively useful for user devices having a limited memory capacity. Also, the self-decidable RNN 430 may provide a faster response rate by deriving a result through iterations less than three times based on the input information 410. In another example, the self-decidable RNN 430 may provide a more accurate result by deriving a result through four or more iterations based on the input information 410.

Referring to FIG. 4B, in response to receiving the input information 410, the self-decidable RNN 430 generates state information $o_i$ through a first network 431. The state information $o_i$ is transmitted to a determiner 435 including a second network 433. The determiner 435 evaluates the state information $o_i$ using the second network 433. For example, the determiner 435 determines whether the state information $o_i$ satisfies a threshold. When it is determined that the state information $o_i$ does not satisfy the condition, the determiner 435 iteratively applies the state information $o_i$ to the first network 431. When it is determined that the state information oi satisfies the threshold, the determiner 435 outputs the state information $o_i$. The state information $o_i$ output from the self-decidable RNN 430 is decoded by a third network 450 and output as a final prediction result 470. Here, the third network 450 may be a decoder of, for example, a softmax layer, as a network that is connected at a rear end of the first network 431 and the second network 433 in the entire system for the application system.

Figure 5:
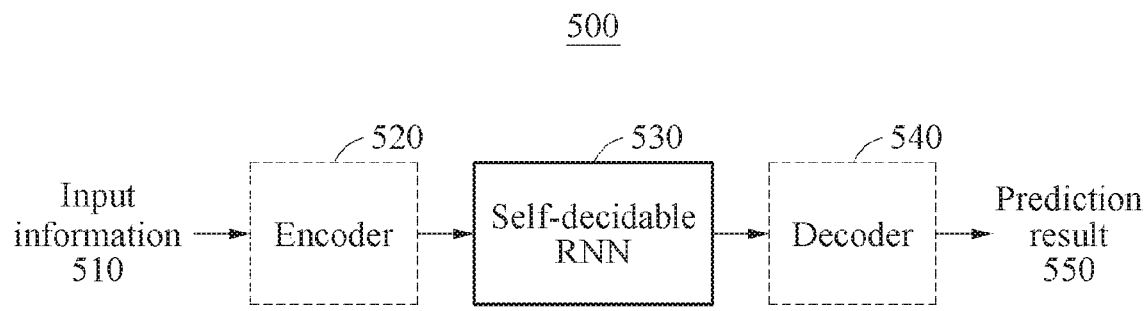
FIG. 5 illustrates an example of a configuration of a neural network.

FIG. 5 illustrates an example of a configuration of a neural network. Hereinafter, a structure of a neural network 500 configured to process sequential data using a self-decidable RNN 530 is described with reference to FIG. 5.

For example, when input information 510 is sequential data, such as an utterance speech of a user, a text sentence, and a moving picture, the neural network 500 encodes the sequential data to an embedding vector of an input dimension of a first network using an encoder 520. The input information 510 may be embedded by the encoder 520 and represented as a single embedding vector. The embedding vector may be iteratively applied, for example, translated until a satisfactory result is acquired by the self-decidable RNN 530.

State information output from the self-decidable RNN 530 is decoded to the sequential data by a decoder 540 and output as a final prediction result 550.

In one example, by selectively applying the encoder 520 and the decoder 540, the self-decidable RNN 530 may be applied to various scenarios, for example, {non-sequential data input, non-sequential data output}, {non-sequential data input, sequential data output}, {sequential data input, sequential data output}, and {sequential data input, non-sequential data output}.

Figure 6:
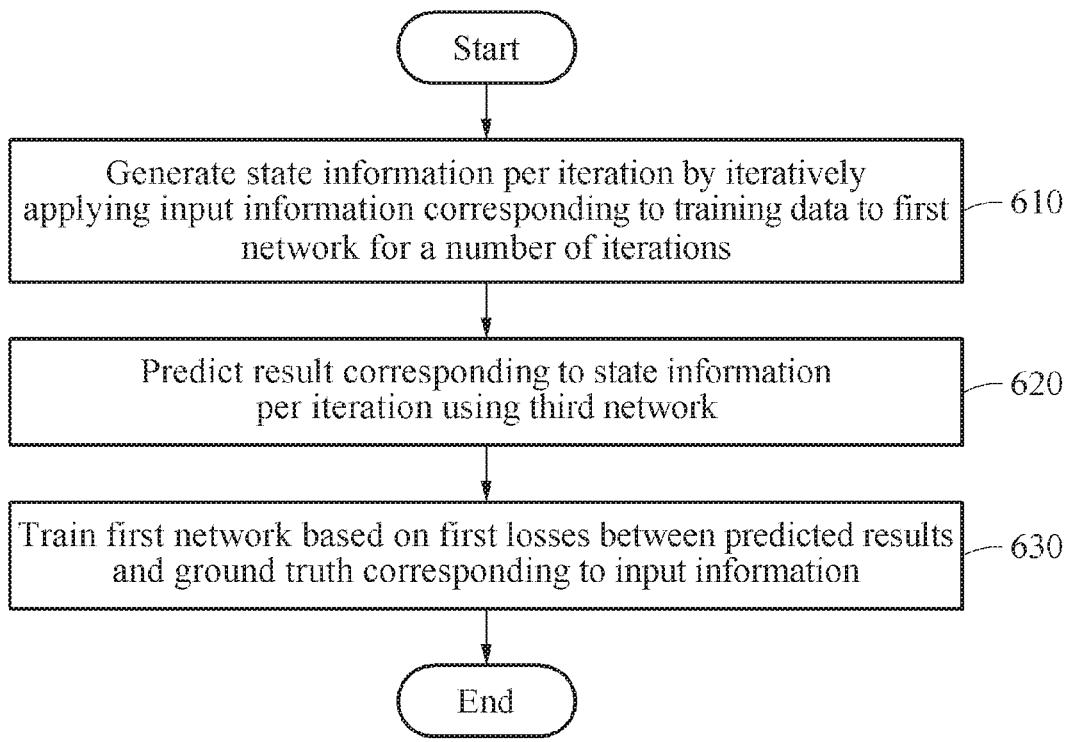
FIG. 6 is a diagram illustrating an example of a training method of a neural network.

FIG. 6 is a diagram illustrating an example of a training method of a neural network. The operations in FIG. 6 may be performed in the sequence and manner as shown, although the order of some operations may be changed or some of the operations omitted without departing from the spirit and scope of the illustrative examples described. Many of the operations shown in FIG. 6 may be performed in parallel or concurrently. One or more blocks of FIG. 6, and combinations of the blocks, can be implemented by special purpose hardware-based computers that perform the specified functions, or combinations of special purpose hardware and computer instructions. In addition to the description of FIG. 6 below, the descriptions of FIGS. 1-5 are also applicable to FIG. 6, and are incorporated herein by reference. Thus, the above description may not be repeated here.

Referring to FIG. 6, in operation 610, an apparatus (hereinafter, a training apparatus) for training a neural network generates state information per iteration by iteratively applying input information corresponding to training data to a first network based on a number of iterations. In an example, the number of iterations is different for each application service. For example, when the application service requires a relatively high level of recognition result such as a biometric recognition, a voice recognition, and a user authentication for financial transactions, the number of iterations is set to be a relatively high value, for example, 15, 20, 50 iterations, etc. In another example, when the application requires a relatively low level of recognition result such as a simple unlock, the number of iterations is set to be a relatively low value, for example, 2, 3, 5 iterations, etc. Input information corresponding to training data may be, for example, an input vector. For example, state information per iteration generated in the first network may be $o_1$, $o_2$, $o_3$, $o_4$, and $o_5$ of FIG. 7.

In operation 610, in an example, the training apparatus encodes the input information as a dimension of the state information and inputs the encoded input information to the first network. In this case, the training apparatus encodes the input information to the dimension of the state information and applies the encoded input information to the first network. In another example, the training apparatus converts the iteratively applied state information to a dimension of the input information and applies the converted state information to the first network. In this case, the training apparatus encodes the state information to the dimension of the input information and applies the encoded state information to the first network.

In operation 620, the training apparatus predicts a result corresponding to the state information for every iteration using a third network. For example, the third network may include prediction layers corresponding to a plurality of softmax layers. Here, the third network may be trained based on first losses. Results predicted in the third network in correspondence to the state information for the respective iterations may be, for example, $p(o_1)$, $p(o_2)$, $p(o_3)$, $p(o_4)$, and $p(o_5)$ of FIG. 7.

In operation 630, the training apparatus trains the first network based on the first losses between the predicted results and ground truth (GT) corresponding to the input information. A method of training, by the training apparatus, the first network and the third network is further described with reference to FIG. 7.

Figure 7:
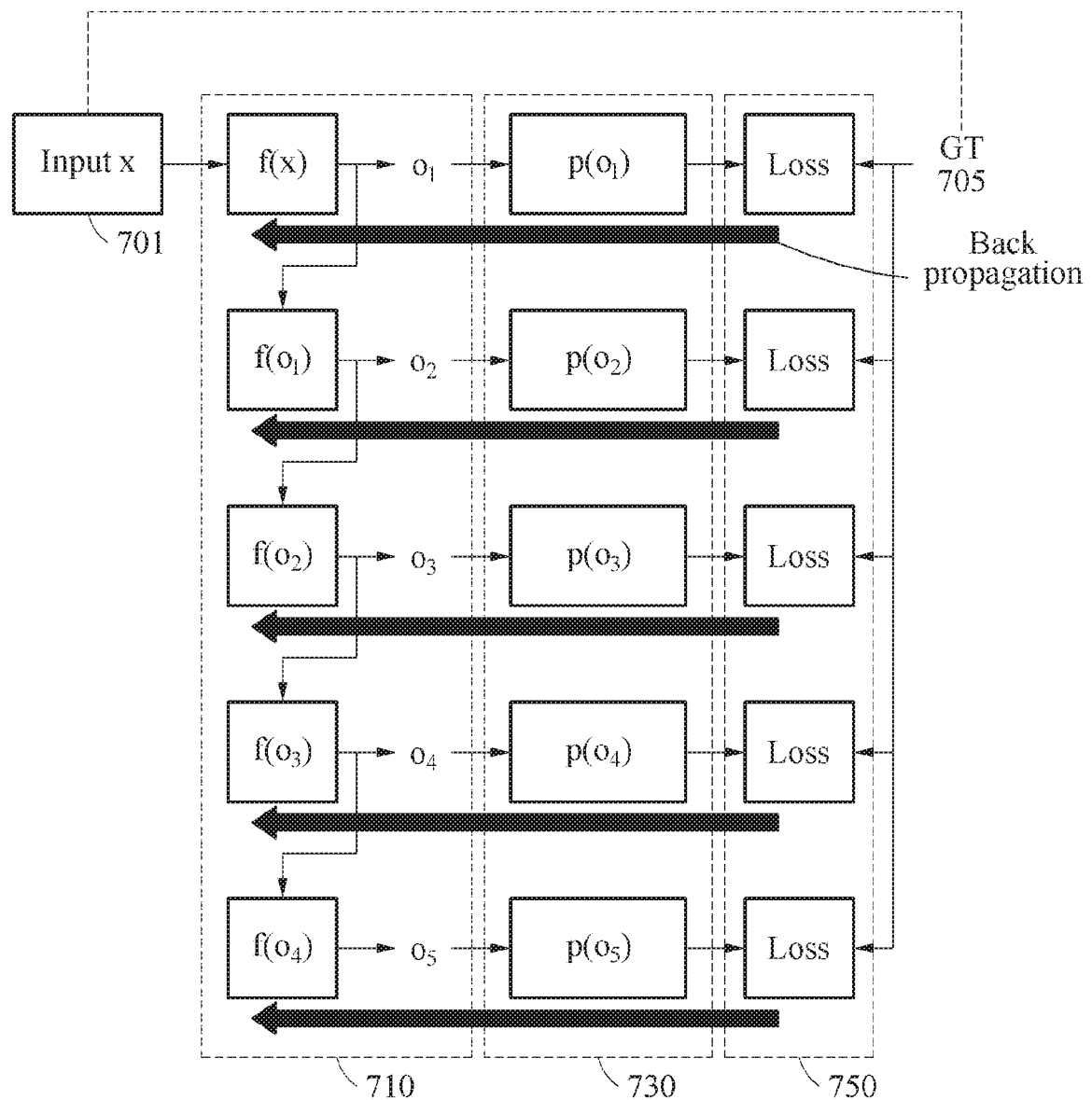
FIGS. 7 to 9 illustrate examples of training methods of a neural network.

FIG. 7 illustrates an example of a training method of a neural network. Hereinafter, a method of training a first network (f) 710 and a third network (p) 730 is described with reference to FIG. 7.

For example, an unrolling training method may be used to train first network (f) 710. The unrolling training method refers to a method of learning losses, for example, the first losses 750, by deriving results $p(o_1)$, $p(o_2)$, $p(o_3)$, $p(o_4)$, and $p(o_5)$ about state information that are results acquired by iteratively applying to the first network (f) 710 a number of iterations, for example, a maximum number of iterations and performing back-propagation.

For example, when the maximum number of iterations is 5, the first network (f) 710 is performed a total of five iterations, such as a $(1\text{-}1)^{st}$ network (f(x)), a $(1\text{-}2)^{nd}$ network (f($o_1$)), a $(1\text{-}3)^{rd}$ network (f($o_2$)), a $(1\text{-}4)^{th}$ network (f($o_3$)), and a $(1\text{-}5)^{th}$ network (f($o_4$)), and generates and outputs state information ($o_1$, $o_2$, $o_3$, $o_4$, $o_5$) per each iteration in response to input information (x) 701 corresponding to training data being input to the first network (f) 710.

When the state information $o_1$, $o_2$, $o_3$, $o_4$, and $o_5$ is input to the third network (p) 730, the third network (p) 730 outputs the results $p(o_1)$, $p(o_2)$, $p(o_3)$, $p(o_4)$, and $p(o_5)$ that are predicted in response to the state information $o_1$, $o_2$, $o_3$, $o_4$, and $o_5$. Here, similar to the first network (f) 710, the third network (p) 730 is performed for a number of iterations as a prediction network configured to predict a result corresponding to state information and outputs the results, for example, $p(o_1)$, $p(o_2)$, $p(o_3)$, $p(o_4)$, and $p(o_5)$, which are predicted in response to the state information.

The training apparatus trains the first network (f) 710 based on the losses, for example, the first losses 750, between the predicted results $p(o_1)$, $p(o_2)$, $p(o_3)$, $p(o_4)$, and $p(o_5)$ and ground truth (GT) 705 corresponding to the input information (x) 701. Here, the ground truth (GT) 705 corresponding to the input information (x) 701 may have the same value for all of the first losses 750.

The first losses 750 are back-propagated to the third network (p) 730 and the first network (f) 710 and used to train the third network (p) 730 and the first network (f) 710.

For example, the training apparatus may train the first network (f) 710 to minimize the first losses 750 between the predicted results $p(o_1)$, $p(o_2)$, $p(o_3)$, $p(o_4)$, and $p(o_5)$ and the ground truth (GT) 705 corresponding to the input information (x) 701. Also, the training apparatus may train the third network (p) 730 to minimize the first losses 750 between the predicted results $p(o_1)$, $p(o_2)$, $p(o_3)$, $p(o_4)$, and $p(o_5)$ and the ground truth (GT) 705 corresponding to the input information (x) 701. In one example, the first network (f) 710 and the third network (p) 730 may be trained together.

Figure 8:
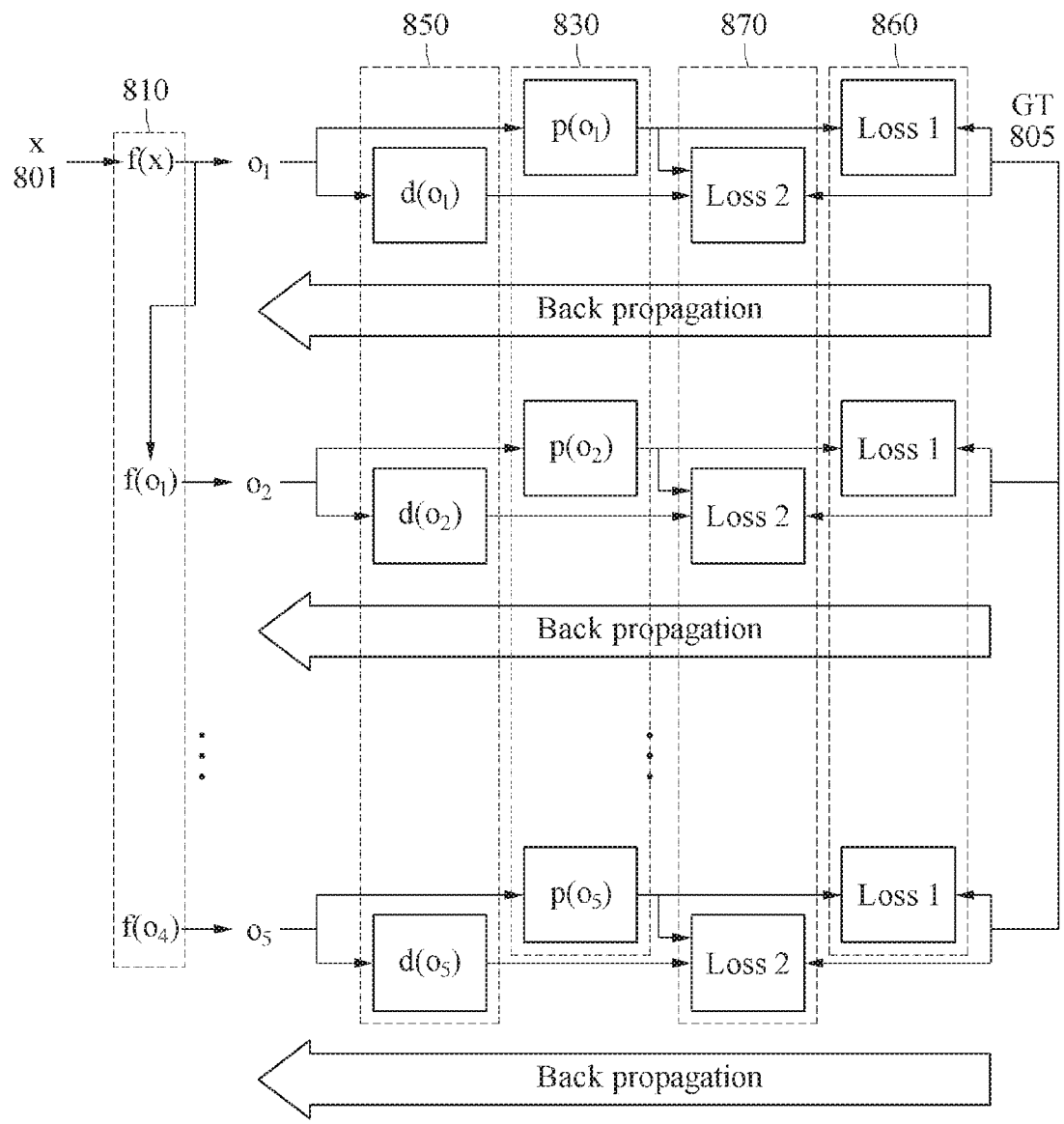

FIG. 8 illustrates an example of a training method of a neural network. Hereinafter, a method of training a second network (d) is described with reference to FIG. 8.

Referring to FIG. 8, a first network (f) 810 is trained using the same unrolling training method as that used to train the first network (f) 710 and a third network (p) 830 is also trained in the same manner as the third network (p) 730. In an example, differences between results (p(o)) predicted for the iterations in the third network (p) 830 and ground truth (GT) 805 corresponding to input information (x) 801 correspond to first losses (Loss 1) 860. The training apparatus trains the first network (f) 810 to minimize the first losses (Loss 1) 860. Likewise, the training apparatus trains the third network (p) 830 to minimize the first losses (Loss 1) 860.

A second network (d) 850 evaluates state information ($o_1$, $o_2$, $o_3$, $o_4$, $o_5$) corresponding to an iterative processing result of the first network (f) 810. For example, the second network (d) 850 may be trained to predict an evaluation value or an evaluation score (d(o)) to evaluate the quality of a corresponding network. In an example, the predicted evaluation value may be determined as various values using various schemes for measuring an evaluation value. For example, the evaluation value may be determined as a continuous value between 0 and 1 or may be determined as a discontinuous value of 0 or 1.

A difference between an evaluation value determined based on a final prediction result of the third network (p) 830 and the ground truth (GT) 805 and an evaluation value predicted in the second network (d) 850 may correspond to a second loss (Loss 2) 870. Here, the evaluation value determined based on the final prediction result of the third network (p) 830 and the ground truth (GT) 805 may be referred to as an evaluation score. The training apparatus trains the second network (d) 850 to minimize the second losses (Loss 2) 870.

Similar to the first network (f) 810, the second network (d) 850 may be trained using the unrolling training method. The second network (d) 850 measures an evaluation value or an evaluation score based on results that are predicted from output of each iteration point, i.e., state information ($o_1$, $o_2$, $o_3$, $o_4$, $o_5$) per iteration by network unrolling. The second network (d) 850 is trained to predict the evaluation score (d(o)) of the result that is derived from the state information ($o_1$, $o_2$, $o_3$, $o_4$, $o_5$). For example, when a prediction accuracy is used for the evaluation value, an accuracy value predicted between 0 and 1 may be output in response to specific state information (o) passing through the second network (d) 850.

In one example, the training apparatus trains the second network (d) 850 based on evaluation values or evaluation scores of results (p(o)) predicted for the respective iterations in the third network (p) 830. The training apparatus determines the evaluation values or the evaluation scores by evaluating the results predicted in the third network (p) 830 based on the results (p(o)) predicted per iteration in the third network (p) 830 and the ground truth (GT) 805.

The training apparatus trains the second network (d) 850 to minimize the second losses (Loss 2) 870 between output of the second network (d) 850, i.e., the predicted evaluation value of the second network (d) 850, and the results (p(o)) predicted for the respective iterations in the third network (p) 830. The evaluation results or the evaluation values corresponding to the results (p(o)) predicted in the third network (p) 830 may be determined based on the results (p(o)) predicted for the respective iterations in the third network (p) 830 and the ground truth (GT) 805.

The training apparatus may train the first network (f) 810 and the second network (d) 850 together. Alternatively, the training apparatus may train the first network (f) 810, the second network (d) 850, and the third network (p) 830 together. In this case, the first network (f) 810 is trained based on the first losses (Loss 1) 860 and the second losses (Loss 2) 870.

In one example, when it is assumed that the second network (d) 850 is sufficiently saturated or trained in latter training of the second network (d) 850, a biased evaluation score may be output. For example, a good evaluation score may be output at all times. If a biased result value is derived from the second network (d) 850 regardless of the state information (o) input to the second network (d) 850, it may hinder training of the second network (d) 850. In an example, the training apparatus may apply noise to at least a portion of the state information (o) per iteration by applying input information corresponding to actual training data through the first network (f) 810 and enables the second network (d) 850 to balance an ability of assigning a high score and an ability of assigning a low score. Same or different noise may be assigned to each piece of the state information per iteration.

Figure 9:
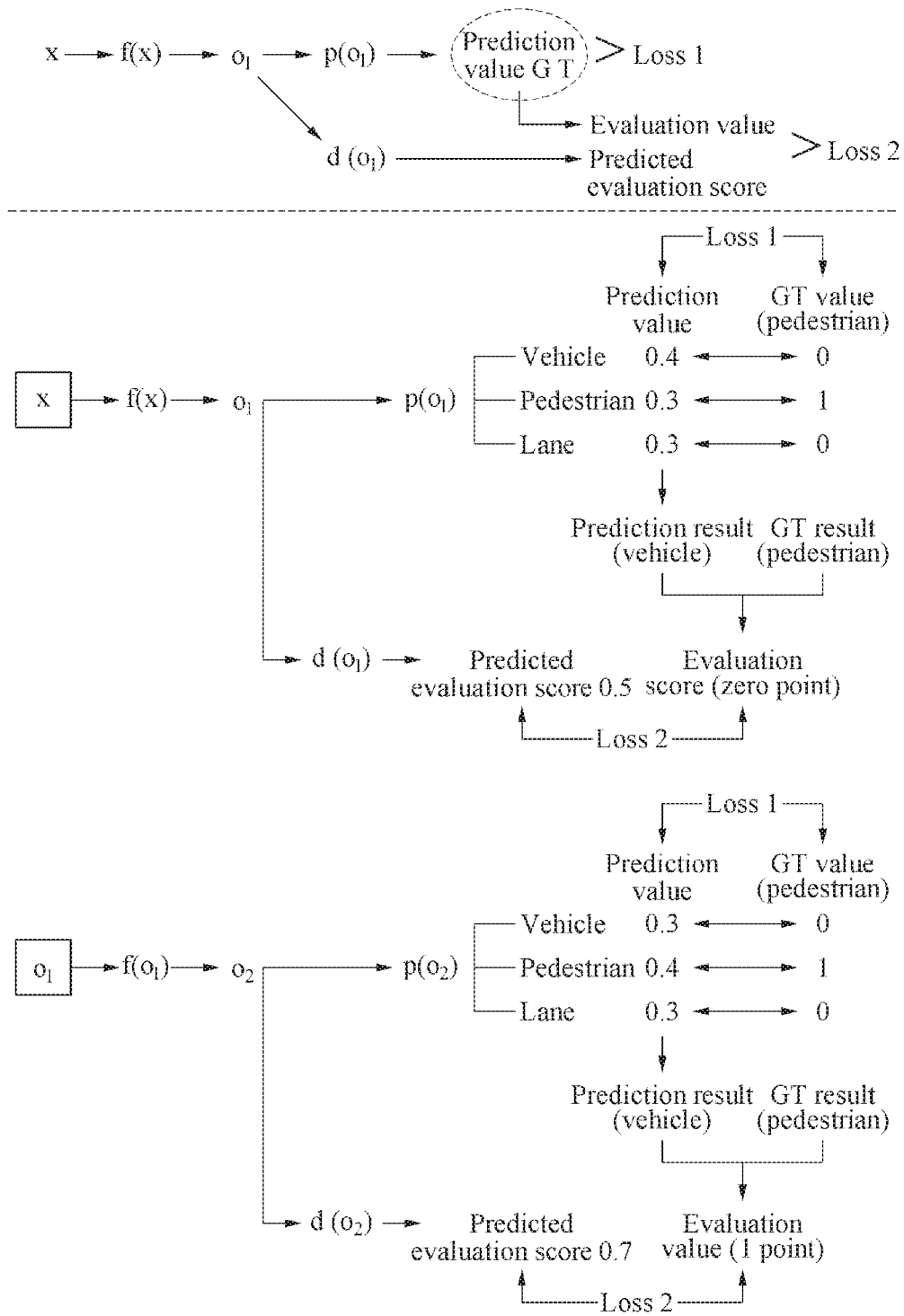

FIG. 9 illustrates an example of a training method of a neural network. Hereinafter, a process of training a neural network configured to classify an object included in an input image when the neural network is configured as a self-decidable RNN will be described with reference to FIG. 9.

For example, when a neural network configured to classify a pedestrian included in an input image is trained, a ground truth in the input image may be a pedestrian. Here, a number of iterations is two and a threshold is 0.65.

When input information (x) corresponding to the input image is input to a first network (f), state information ($o_1$) is output from the first network (f) (f(x)), the state information ($o_1$) is applied to a second network (d) (d($o_1$)) and a third network (p) (p($o_1$)). In this example, the third network ($p(o_1)$) to which the state information ($o_1$) is applied may predict a result corresponding to the state information ($o_1$), for example, each class such as a vehicle, a pedestrian, and a lane. When the state information ($o_1$) is predicted in the third network ($p(o_1)$) as a prediction value, for example, vehicle: 0.4, pedestrian: 0.3, and lane: 0.3, each prediction value may represent a probability capable of predicting the state information ($o_1$) as the corresponding class or an accuracy that the corresponding state information ($o_1$) belongs to a corresponding class. In an example, the first network (f) may be trained to minimize a difference (Loss 1) between 0.3 that is the prediction value of the class pedestrian and 1 that is a value corresponding to ground truth (GT) pedestrian.

Also, as the prediction value, 0.4, of the vehicle is largest among the prediction values of the respective classes, a prediction result of the third network ($p(o_1)$) is "vehicle". The training apparatus determines an evaluation score by evaluating the prediction result of the third network ($p(o_1)$) based on the prediction result "vehicle" of the third network ($p(o_1)$) and the ground truth (GT) "pedestrian". Since the prediction result "vehicle" of the third network ($p(o_1)$) and the ground truth (GT) "pedestrian" differ from each other, the training apparatus determines the evaluation score for the prediction result of the third network ($p(o_1)$) as 0.

The training apparatus trains the second network ($d(o_1)$) configured to evaluate the state information ($o_1$) based on the evaluation score (zero point) for the prediction result of the third network ($p(o_1)$). For example, when an evaluation value, that is, an evaluation score, predicted in the second network ($d(o_1)$) is 0.5, the training apparatus trains the second network ($d(o_1)$) to minimize a difference (Loss 2) between the evaluation score, zero point, for the prediction result of the third network ($p(o_1)$) and the evaluation value, 0.5, predicted in the second network ($d(o_1)$). Here, since the number of iterations is set as two, the training apparatus may iteratively apply the state information ($o_1$) to the first network (f).

When the state information ($o_1$) is iteratively applied to the first network (f), the first network (f(0)) outputs state information ($o_2$) and the state information ($o_2$) is applied to the second network ($d(o_2)$) and the third network ($p(o_2)$). Here, the third network ($p(o_2)$) to which the state information ($o_2$) is applied may predict a result corresponding to the state information ($o_2$) as a prediction value, such as vehicle: 0.3, pedestrian: 0.4, and lane: 0.3. Here, the first network (f(0)) may be trained to minimize a difference (Loss 1) between 0.4 that is the prediction value of the class pedestrian and 1 that is a value corresponding to ground truth (GT) pedestrian.

Here, as the prediction value, 0.4, of the pedestrian is largest among prediction values of the respective classes output from the third network ($p(o_2)$), a prediction result of the third network ($p(o_2)$) is "pedestrian". The training apparatus determines an evaluation score by evaluating the prediction result of the third network ($p(o_2)$) based on the prediction result "pedestrian" of the third network ($p(o_2)$) and the ground truth (GT) "pedestrian". Here, since the prediction result "pedestrian" of the third network ($p(o_2)$) and the ground truth (GT) "pedestrian" are identical to each other, the training apparatus determines the evaluation score for the prediction result of the third network ($p(o_2)$) as 1.

The training apparatus trains the second network ($d(o_2)$) configured to evaluate the state information ($o_2$) based on the evaluation score (1 point) for the prediction result of the third network ($p(o_2)$). For example, when an evaluation value, that is, an evaluation score, predicted in the second network ($d(o_2)$) is 0.7, the training apparatus trains the second network ($d(o_2)$) to minimize a difference (Loss 2) between the evaluation score, 1 point, for the prediction result of the third network ($p(o_2)$) and the evaluation value, 0.7, predicted in the second network ($d(o_2)$).

Depending on examples, the neural network may output a sentence in response to voice recognition. In this example, a third network may compare an entire prediction sentence and a ground truth sentence and may determine a prediction value as "1" if all the words included in a single sentence match and may determine the prediction value as "0" if none of the words match. In this case, the third network may predict a result corresponding to state information in a form of a discrete value, for example, a prediction value.

In an example, the third network may predict a result corresponding to state information in a form of a continuous value between 0 and 1 by assigning a partial point for each of the words included in a single sentence. In this case, an evaluation value may have a continuous value between 0 and 1, and a second network may be trained to predict a continuous value between 0 and 1.

In one example, the neural network may be applied to various fields, such as voice recognition, biometric information recognition, text recognition, image capturing, sentimental analysis, analysis of stock price, analysis of oil price, and the like, in addition to the aforementioned fields.

Figure 10:
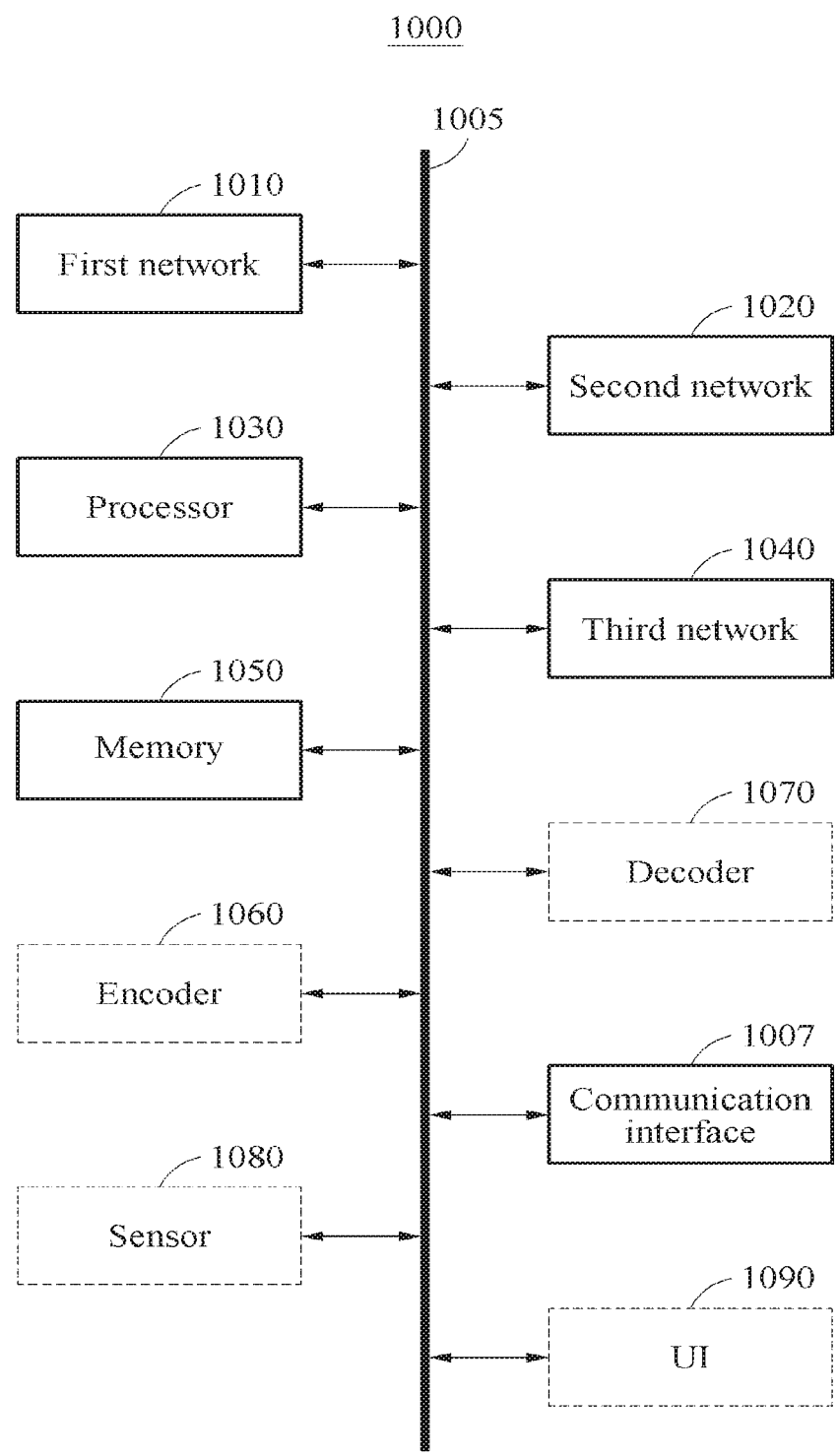
FIG. 10 illustrates an example of a configuration of a neural network.

FIG. 10 illustrates an example of a configuration of a neural network. Referring to FIG. 10, a neural network 1000 includes a first network 1010, a second network 1020, and a processor 1030. The neural network 1000 further includes a third network 1040, a memory 1050, an encoder 1060, a decoder 1070, a sensor 1080, a UI or a display 1090, and a communication interface 1007. The first network 1010, the second network 1020, the processor 1030, the third network 1040, the memory 1050, the encoder 1060, the decoder 1070, the sensor 1080, the UI or the display 1090, and the communication interface 1007 communicate with each other through a communication bus 1005.

The first network 1010 generates and outputs state information based on input information. The first network 1010 iteratively processes the input information to provide an application service. The input information may include at least one of, for example, single data and sequential data. The input information may be, for example, an image and a sound.

The second network 1020 determines whether the state information satisfies a condition. The second network 1020 evaluates state information corresponding to an iterative processing result of the first network 1010. For example, the second network 1020 may compare a threshold and an evaluation result corresponding to the state information, output from the second network 1020. Also, the second network 1020 may compare a number of iterations to a number of times the state information is iteratively applied to the first network 1010.

In an example, the processor 1030 iteratively applies the state information to the first network 1010 in response to the state information being determined to not satisfy the condition in the second network 1020. In an example, the processor 1030 outputs the state information in response to the state information being determined to satisfy the condition in the second network 1020.

In an example, the processor 1030 encodes the input information to a dimension of the state information and applies the encoded input information to the first network 1010. In an example, the processor 1030 encodes the state information to a dimension of the input information and applies the encoded state information to the first network 1010.

Also, the processor 1030 performs at least one method described above with reference to FIGS. 1 to 9 or an algorithm corresponding thereto.

The processor 1030 refers to a data processing device configured as hardware with a circuitry in a physical structure to execute desired operations. For example, the desired operations may include codes or instructions included in a program. For example, the data processing device configured as hardware may include a microprocessor, a central processing unit (CPU), a processor core, a multicore processor, a multiprocessor, an application-specific integrated circuit (ASIC), and a field programmable gate array (FPGA). The processor 1030 executes the program and controls the neural network 1000. In an example, the processor 1030 may be a graphics processor unit (GPU), reconfigurable processor, or have any other type of multi- or single-processor configuration. The program code executed by the processor 1030 is stored in the memory 1050. Further details regarding the processor 1030 are provided below.

The third network 1040 decodes the state information to provide an application service.

The memory 1050 stores the input information and the state information corresponding to the iterative processing result of the first network 1010. The memory 1050 stores a result of evaluating, by the second network 1020, of the state information. The memory 1050 stores an embedding vector encoded by the encoder 1060 and/or sequential data acquired by decoding, by the decoder 1070, of the state information. The memory 1050 stores a variety of information generated during the processing at the processor 1030. In addition, a variety of data and programs may be stored in the memory 1050. The memory 1050 may include, for example, a volatile memory or a non-volatile memory. The memory 1050 may include a mass storage medium, such as a hard disk, to store a variety of data. Further details regarding the memory 1050 are provided below.

For example, when the input information is sequential data, the encoder 1060 encodes the sequential data to an embedding vector of an input dimension of the first network 1010. Here, the processor 1030 applies the embedding vector to the first network 1010.

For example, when the input information is sequential data, the decoder 1070 decodes the state information to the sequential data. Here, the processor 1030 outputs the decoded sequential data.

The sensor 1080 includes, for example, a microphone and/or an image sensor. In an example, the sensor 1080 is camera to sense video data. In another example, the camera is configured to recognize audio input. In another example, the sensor 1080 senses both the image data and the voice data. In an example, the sensor 1080 senses a voice using a well-known scheme, for example, a scheme of converting a voice input to an electronic signal. An output of the sensor 1080 is transferred to the processor 1030 or the memory 1050, and output of the sensor 1080 may also be transferred directly to, or operate as, an input layer of the first network 1010 discussed herein.

The decoded state information may be output through the display or the UI 1090. The display or the UI 1090 is a physical structure that includes one or more hardware components that provide the ability to render a user interface and/or receive user input. However, the display or the UI 1090 is not limited to the example described above, and any other displays, for example, smart phone and eye glass display (EGD) that are operatively connected to the neural network 1000 may be used without departing from the spirit and scope of the illustrative examples described. In an example, user adjustments or selective operations of the neural network processing operations discussed herein may be provided by display or the UI 1090, which may include a touch screen or other input/output device/system, such as a microphone or a speaker.

The communication interface 1007 receives the input information from outside of the neural network 1000. Also, the communication interface 1007 transmits output of the neural network 1000 to the outside of the neural network 1000.

The self-decidable RNN 430, first network 431, determiner 435, second network 433, third network 450, encoder 520, decoder 540, self-decidable RNN 530, and apparatuses, units, modules, devices, other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In an example, the instructions or software includes at least one of an applet, a dynamic link library (DLL), middleware, firmware, a device driver, an application program storing the method of outputting the state information. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, card type memory such as multimedia card, secure digital (SD) card, or extreme digital (XD) card, magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An operation method of a neural network comprising a first network recurrently outputting state information, a second network self-deciding whether to perform recurrent processing of the first network, and a third network providing an application service, the method comprising:
    acquiring, based on input information, first state information output from the first network;
    acquiring, based on the first state information, a first score output from the second network, the first score indicating that the first state information is sufficient to perform the third network providing the application service;
    determining whether the first state information satisfies a condition by comparing the first score and a predetermined threshold corresponding to the condition; and
    in response to a result of the determining being that the first state information does not satisfy the condition, and until a current updated state information satisfies the condition, iteratively perform:
        an applying of a previous updated state information, previously output by the first network, as an input to the first network to output the current updated state information;
        an applying of the current updated state information, currently output by the first network, as an input to the second network to output an updated score; and
        a second determining whether the current updated state information satisfies the condition by comparing the updated score and the predetermined threshold;
    in response to a determination that finally updated state information satisfies the condition, decoding, using the third network, the finally updated state information to provide the application service.

2. The method of claim 1, wherein the acquiring of the first state information comprises:
    encoding the input information as a dimension of the first state information; and
    applying the encoded input information to the first network for the acquiring of the first state information.

3. The method of claim 1, wherein, in the iterative performance, the applying of the previous updated state information comprises encoding the previous updated state information as a dimension of the input information, and
applying the encoded previous updated state information to the first network.

4. The method of claim 1, wherein the input information comprises any one or any combination of single data and sequential data.

5. The method of claim 1, wherein the acquiring of the first state information comprises:
encoding sequential data to an embedding vector of an input dimension of the first network in response to the input information being the sequential data; and
applying the embedding vector to the first network for the acquiring of the first state information.

6. The method of claim 1, wherein the first network comprises a neural network trained for voice recognition or a neural network trained for image recognition.

7. The method of claim 1, wherein the first network comprises at least one of a fully-connected layer, a simple recurrent neural network, a long-short term memory (LSTM), or gated recurrent units (GRUs).

8. A non-transitory computer-readable recording medium storing instructions that when executed by a processor, configure the processor to implement the method of claim 1.

9. A method of training a neural network comprising a self-decidable first network recurrently outputting state information, a second network self-deciding whether to perform recurrent processing of the first network, and a third network providing an application service, the method comprising:
applying input information, corresponding to training data, to the first network for a number of iterations;
for each of the iterations:
iteratively generating a currently updated state information based on a previously updated state information until a calculated evaluation of the generated state information indicates that the generated state information is satisfactory state information that satisfies a condition; and
predicting, using the third network, a classifying result corresponding to the currently updated state information to provide the application service; and
training a second network configured to perform an inference calculation with respect to corresponding generated state information, for each of the iterations, based on respective evaluation scores of the results of the predicting,
wherein the second network evaluates the state information for each of the iterations by comparing a score indicating that the output of the first network is sufficient to perform the task of providing the application service, and a threshold to determine whether the state information is saturated to the score.

10. The method of claim 9,
wherein the second network is configured to generate a first output representative of the generated state information of each of the iterations, being determined to have met the condition, and a second output representative of the generated state information of each of the iterations, being determined to have met the condition, and for each of the iterations, an output of the second network is, dependent on results of the performed inference calculation, one of the first output and the second output.

11. The method of claim 10, wherein the training of the second network comprises determining, for each of the iterations, the respective evaluation scores by evaluating the predicted result and a result predicted for a corresponding ground truth.

12. The method of claim 10, wherein the training of the second network comprises applying, for each of the iterations, noise to a portion of the generated state information.

13. The method of claim 10, wherein the training of the first network comprises training the third network based on respective first losses.

14. The method of claim 10, wherein the applying comprises:
encoding the input information as a predetermined dimension of respective generated state information; and
applying the encoded input information to the first network.

15. The method of claim 10, wherein the generating comprises, for each of the iterations after a first iteration:
encoding the generated state information as a dimension of the input information; and
applying the encoded generated state information to the first network.

16. The method of claim 9, wherein a threshold for a maximum number for the number of iterations performed is based on a level score of recognition corresponding to an application service provided by the neural network.

17. The method of claim 9, wherein a threshold for a maximum number for the number of iterations performed is increased in response to higher level score of recognition corresponding to a first application service provided by the neural network, and the threshold of the maximum number is decreased in response to a lower level score of recognition of a second application service provided by the neural network.

18. A non-transitory computer-readable recording medium storing instructions that, when executed by a processor, cause the processor to implement the method of claim 9.

19. An apparatus comprising:
a processor configured to perform training or an inference operation with a neural network comprising a first network recurrently outputting state information, a second network self-deciding whether to perform recurrent processing of the first network, and a third network providing an application service, including the processor being further configured to:
input information to a first network configured to generate first state information based on the input information;
acquire, based on the first state information, a first score output from the second network, the first score indicating that the first state information is sufficient to perform the third network providing the application service;
determine whether the first state information satisfies a condition by comparing the first score and a predetermined threshold corresponding to the condition; and
in response to a result of the determining being that the first state information does not satisfy the condition, and until a current updated state information satisfies the condition, iteratively perform:
an applying of a previous updated state information, previously output by the first network, as an input to the first network to output the current updated state information;

an applying of the current updated state information, currently output by the first network, as an input to the second network to output an updated score; and a second determining whether the current updated state information satisfies the condition by comparing the updated score and the predetermined threshold; and in response to a determination that finally updated state information satisfies the condition, decoding, using the third network, the finally updated state information to provide the application service.

20. The apparatus of claim 19, wherein the processor is configured to:

input the output respective state information to a third network configured to decode the output respective state information, and to provide an application service based on a result of the third network.

21. The apparatus of claim 19, wherein the processor is further configured to encode the input information as a dimension of the state information, and to apply the encoded input information to the first network.

22. The apparatus of claim 19, wherein the processor is further configured to encode the state information as a dimension of the input information, and to apply the encoded state information to the first network.

23. The apparatus of claim 19, wherein the input information comprises any one or any combination of single data and sequential data.

24. The apparatus of claim 23, further comprising:

a decoder configured to decode the output respective state information as the sequential data, in response to the input information being the sequential data, wherein the processor is further configured to output the decoded state information.

25. The apparatus of claim 19, further comprising:

an encoder configured to encode sequential data as an embedding vector of an input dimension of the first network, in response to the input information being the sequential data, wherein the processor is further configured to apply the embedding vector to the first network.

* * * * *